(12) United States Patent
Childress et al.

(10) Patent No.: US 9,047,891 B1
(45) Date of Patent: Jun. 2, 2015

(54) CURRENT-PERPENDICULAR-TO-THE-PLANE GIANT MAGNETORESISTANCE (CPP-GMR) SENSOR WITH INDIUM-ZINC-OXIDE (IZO) SPACER LAYER

(71) Applicant: HGST Netherlands B.V., Amsterdam (NL)

(72) Inventors: Jeffrey R. Childress, San Jose, CA (US); Tomoya Nakatani, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/269,119

(22) Filed: May 3, 2014

(51) Int. Cl.
G11B 5/39 (2006.01)

(52) U.S. Cl.
CPC ........................................ *G11B 5/39* (2013.01)

(58) Field of Classification Search
CPC ................................ G11B 5/39; G11B 5/3903
USPC ................... 360/324.2, 324.11, 324, 324.1
See application file for complete search history.

(56) References Cited

U.S. PATENT DOCUMENTS

| 7,247,394 | B2 * | 7/2007 | Hatwar et al. ................. 428/690 |
| 7,522,392 | B2 * | 4/2009 | Carey et al. ................. 360/324.2 |
| 7,826,189 | B1 | 10/2010 | Tsuchiya et al. |
| 7,826,180 | B2 * | 11/2010 | Tsuchiya et al. ........... 360/324.1 |
| 8,320,080 | B1 * | 11/2012 | Braganca et al. ............. 360/128 |
| 8,379,352 | B1 * | 2/2013 | Braganca et al. .......... 360/324.2 |
| 8,432,645 | B2 | 4/2013 | Matsuzawa et al. |
| 8,462,461 | B2 * | 6/2013 | Braganca et al. .......... 360/125.3 |
| 8,611,053 | B2 * | 12/2013 | Brinkman et al. ........ 360/324.11 |
| 8,613,822 | B2 * | 12/2013 | Van Nutt et al. ................. 156/71 |
| 8,637,169 | B2 * | 1/2014 | Van Nutt et al. .............. 428/701 |
| 8,670,216 | B1 * | 3/2014 | Braganca et al. ......... 360/324.11 |
| 8,675,309 | B2 * | 3/2014 | Braganca et al. .......... 360/125.3 |
| 8,778,109 | B2 * | 7/2014 | Van Nutt et al. ................. 156/69 |
| 2012/0212859 | A1 | 8/2012 | Tsuchiya et al. |
| 2012/0212860 | A1 | 8/2012 | Koike et al. |
| 2013/0052484 | A1 | 2/2013 | Childress et al. |
| 2014/0101919 | A1 * | 4/2014 | Van Nutt et al. ................. 29/428 |

OTHER PUBLICATIONS

Shimazawa et al., "CPP-GMR Film With ZnO-Based Novel Spacer for Future High-Density Magnetic Recording", IEEE Trans Magn vol. 46, No. 6, Jun. 2010, 1487.

* cited by examiner

*Primary Examiner* — Allen T Cao
(74) *Attorney, Agent, or Firm* — Thomas R. Berthold

(57) ABSTRACT

A current-perpendicular-to-the-plane giant magnetoresistance (CPP-GMR) sensor has a spacer layer that includes electrically conductive indium-zinc-oxide (IZO), i.e., $In_2O_3$ plus ZnO where the ZnO is present between 5-30 weight percent. The spacer layer may include a protective sublayer, like a layer of Ag, below the IZO layer to prevent oxidation of the reference layer from the oxygen in the IZO layer. The spacer layer includes a top layer consisting essentially of Zn located above the IZO layer below the free layer. Measurements from a large number of CPP-GMR sensors with spacer layers of Ag(9 Å)/IZO(20 Å)/Zn(8 Å) show $\Delta R/R$ values of about 15-17% and acceptable RA values of around 100 $m\Omega \cdot \mu m^2$.

20 Claims, 7 Drawing Sheets

| Ru (120 Å) | Cap layer |
| CoFe$_{50}$ (30 Å) | Free Layer |
| Ag alloy (35 Å) | Spacer Layer |
| CoFe$_{50}$ (30 Å) | Reference Layer |
| IrMn (60 Å) | Antiferromagnetic Layer |
| Ru (30 Å) | Seed Layer |
| Ta (30 Å) | |
| NiFe | Shield Layer |
| Substrate | |

FIG. 5

| Ru (120 Å) | Cap layer |
| CoFe$_{50}$ (30 Å) | Free Layer |
| IZO (15-60 Å) | Spacer Layer |
| CoFe$_{50}$ (30 Å) | Reference Layer |
| IrMn (60 Å) | Antiferromagnetic Layer |
| Ru (30 Å) | Seed Layer |
| Ta (30 Å) | |
| NiFe | Shield Layer |
| Substrate | |

FIG. 6

| Cap | Ru | 120 Å |
|---|---|---|
| Free Layer | CoFe$_{50}$ | 10 Å |
| | Co$_{35}$Fe$_{35}$Ge$_{30}$ | 40 Å |
| | CoFe$_{50}$ | 5 Å |
| Spacer | Ag/IZO/Zn | 37 Å |
| Reference Layer | CoFe$_{50}$ | 5 Å |
| | Co$_{35}$Fe$_{35}$Ge$_{30}$ | 40 Å |
| | CoFe$_{50}$ | 10 Å |
| Antiferro-magnet | IrMn | 60 Å |
| Seed | Ru | 20 Å |
| | Ta | 30 Å |

| Cap | 120 Å Ru | | |
|---|---|---|---|
| Free Layer | 32 Å CoFe$_{50}$ | 10 Å CoFe$_{50}$ | 10 Å CoFe$_{50}$ |
| | | 40 Co$_{35}$Fe$_{35}$Ge$_{30}$ | 40 Å Co$_2$(MnFe)Ge |
| | | 5 Å CoFe$_{50}$ | 5 Å CoFe$_{50}$ |
| Spacer Layer | 9 Å Zn | | |
| | 20 Å IZO | | |
| | 9 Å Ag | | |
| Reference Layer | 27 Å CoFe$_{50}$ | 5 Å CoFe$_{50}$ | 5 Å CoFe$_{50}$ |
| | | 28 Co$_{35}$Fe$_{35}$Ge$_{30}$ | 28 Å Co$_2$(MnFe)Ge |
| | | 10 Å CoFe$_{50}$ | 10 Å CoFe$_{50}$ |
| Coupling Layer | 8 Å Ru | | |
| Pinned Layer | 27 Å CoFe$_{50}$ | | |
| Antiferro-magnet | 60 Å IrMn | | |
| Seed | 20 Å Ru | | |
| | 30 Å Ta | | |

CURRENT-PERPENDICULAR-TO-THE-PLANE GIANT MAGNETORESISTANCE (CPP-GMR) SENSOR WITH INDIUM-ZINC-OXIDE (IZO) SPACER LAYER

BACKGROUND OF THE INVENTION

1. Field of the Invention

The invention relates generally to a current-perpendicular-to-the-plane giant magnetoresistance (CPP-GMR) sensor that operates with the sense current directed perpendicularly to the planes of the layers making up the sensor stack, and more particularly to a CPP-GMR sensor with an improved spacer layer.

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a non-magnetic electrically conductive spacer layer, which is typically formed of Cu or Ag. One ferromagnetic layer, typically called the "reference" layer, has its magnetization direction fixed, such as by being pinned by exchange coupling with an adjacent antiferromagnetic layer, and the other ferromagnetic layer, typically called the "free" layer, has its magnetization direction free to rotate in the presence of an external magnetic field. With a sense current applied to the sensor, the rotation of the free-layer magnetization relative to the fixed-layer magnetization is detectable as a change in electrical resistance. If the sense current is directed perpendicularly through the planes of the layers in the sensor stack, the sensor is referred to as current-perpendicular-to-the-plane (CPP) sensor.

CPP-GMR sensors are to be distinguished from CPP tunneling magnetoresistance (TMR) sensors. In a CPP-TMR sensor spin-dependent tunneling of electrons occurs across an insulating tunnel barrier layer (like MgO or $TiO_2$), whereas in a CPP-GMR sensor spin-dependent scattering of conduction electrons occurs at the interfaces between the conductive spacer layer and the magnetic layers as well as in the magnetic layers themselves.

In a magnetic recording disk drive CPP-GMR read sensor or head, the magnetization of the fixed or pinned layer is generally perpendicular to the plane of the disk, and the magnetization of the free layer is generally parallel to the plane of the disk in the absence of an external magnetic field. When exposed to an external magnetic field from the recorded data on the disk, the free-layer magnetization will rotate, causing a change in electrical resistance. The magnitude of the CPP-GMR effect with standard ferromagnetic materials (such as CoFe) for the free and reference layers and nonmagnetic metals such as Cu and Ag for the spacer layer is not large enough for read heads of the next generation of disk drives. The magnitude of CPP-GMR is indicated by $\Delta R/R$ (magnetoresistance or magnetoresistive ratio) or $\Delta RA$ (resistance change-area product). The voltage output of the read sensor is given by $\Delta R/R \times V_{bias}$, equivalently by $\Delta RA \times J_{bias}$, where $V_{bias}$ and $J_{bias}$ are the bias voltage and bias current density to the sensor, respectively. Therefore, increasing the CPP-GMR magnitude improves the read sensor performance.

The use of oxide semiconductors for the spacer layer has been proposed as a way to increase CPP-GMR magnitude. CPP-GMR sensors with spacer layers formed of semiconductor oxides like ZnO have been described, for example in U.S. Pat. No. 7,826,180 B2; U.S. Pat. No. 8,432,645 B2; and Shimazawa et al., "CPP-GMR Film With ZnO-Based Novel Spacer for Future High-Density Magnetic Recording", IEEE Trans Magn Vol. 46, No. 6, June 2010, 1487. These sensors show $\Delta R/R$ up to about 20% with RA values of about 200-300 $m\Omega \cdot \mu m^2$. However, resistance noise becomes a dominant source of noise in CPP-GMR sensors when the RA value exceeds about 100 $m\Omega \cdot \mu m^2$, which limits the value of these semiconductor oxide spacer layers. Additionally, the large variation of RA values of devices on a wafer with ZnO spacer layers has been observed, which is an obstacle to high yield wafer-scale of manufacturing of sensors with these materials as spacer layers.

What is needed are CPP-GMR sensors with high $\Delta R/R$ and acceptable RA values and that can manufactured at wafer-scale with small variations in RA values.

SUMMARY OF THE INVENTION

Embodiments of the invention relate to a CPP-GMR sensor with a spacer layer that includes electrically conductive indium-zinc-oxide (IZO), i.e., $In_2O_3$ plus ZnO where the ZnO is present between 5-30 weight percent. The spacer layer may include a protective sublayer, like a layer of Ag, below the IZO layer to prevent oxidation of the reference layer from the oxygen in the IZO layer. The spacer layer includes a top layer consisting essentially of Zn located above the IZO layer below the free layer. Measurements from a large number of CPP-GMR sensors with spacer layers of Ag(9 Å)/IZO(20 Å)/Zn(8 Å) show $\Delta R/R$ values of about 15-17% and acceptable RA values of around 100 $m\Omega \cdot \mu m^2$. These sensors also exhibit substantially less variation in RA values than prior art sensors with Cu/ZnO/Zn spacer layers.

For a fuller understanding of the nature and advantages of the present invention, reference should be made to the following detailed description taken together with the accompanying figures.

BRIEF DESCRIPTION OF THE DRAWINGS

FIG. 5 is a list of the structure of CPP-GMR film stacks with Ag alloy (35 Å) spacer layers according to the prior art.

FIG. 6 is a list of the structure of CPP-GMR film stacks with IZO spacer layers of various thicknesses according to embodiments of the invention.

FIG. 11 is a list of the structure of CPP-GMR film stacks with Co$_2$(MnFe)Ge free and reference layers and Ag(9 Å)/IZO(20 Å)/Zn(8 Å) spacer layers according to embodiments of the invention.

DETAILED DESCRIPTION OF THE INVENTION

Figure 1:
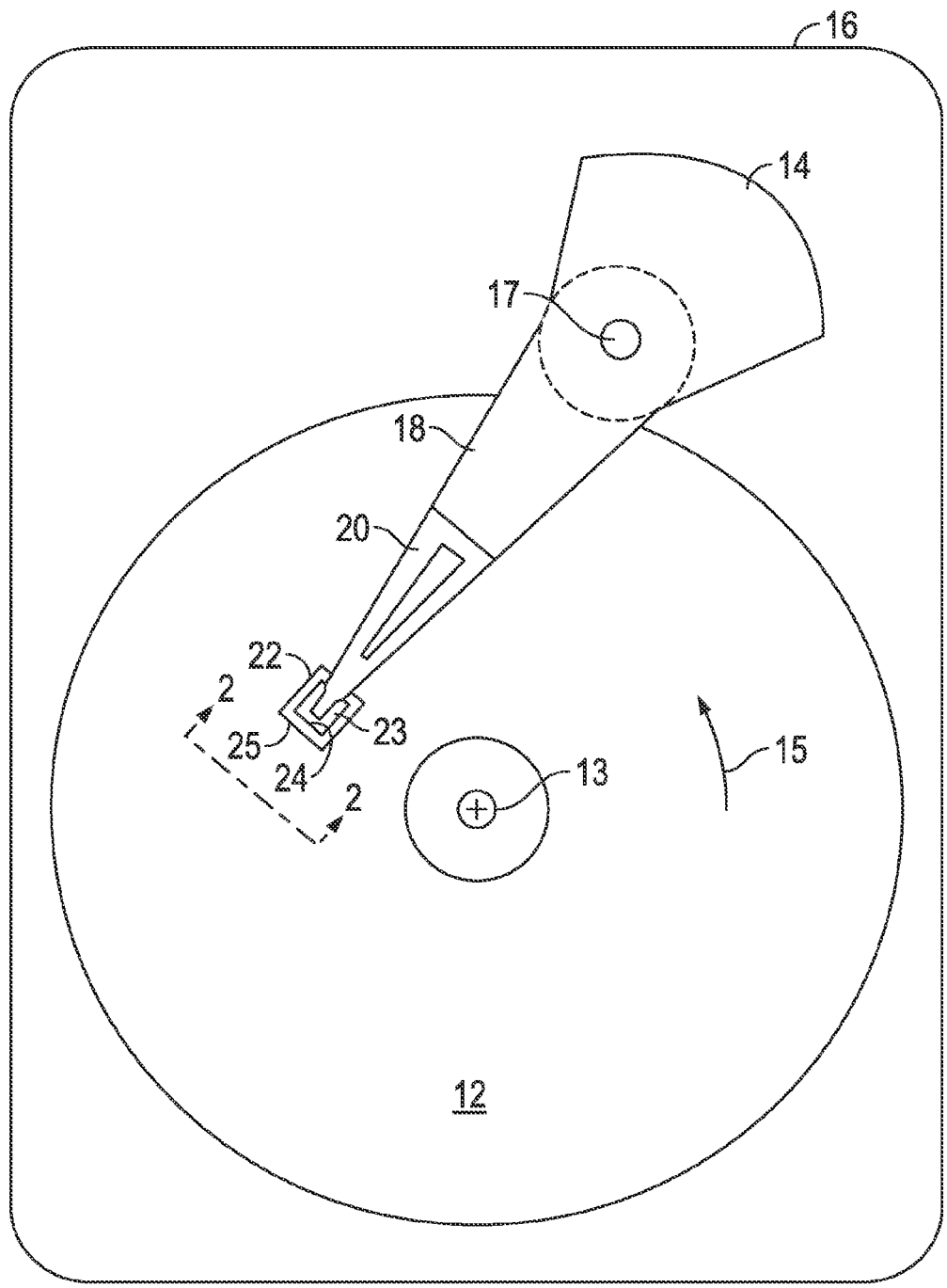
FIG. 1 is a schematic top view of a conventional magnetic recording hard disk drive with the cover removed.

The CPP magnetoresistive (MR) sensor made according to this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
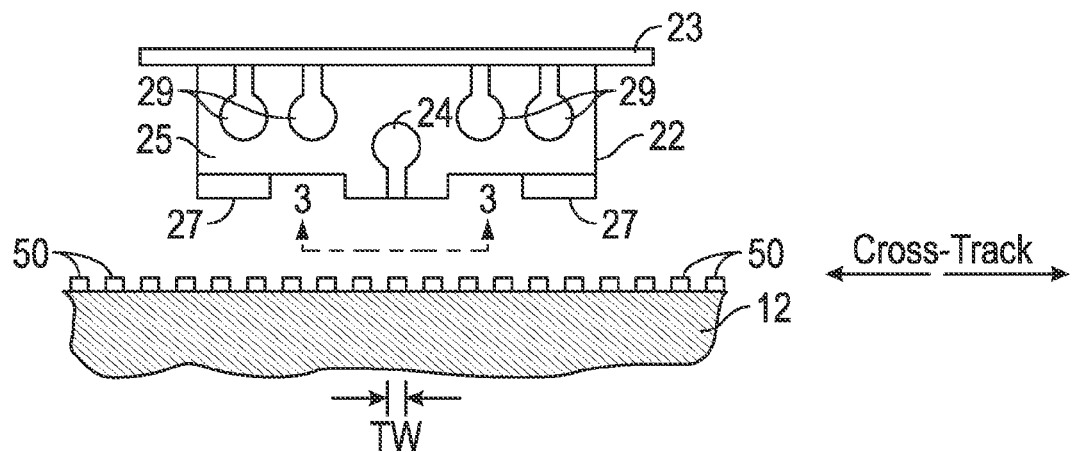
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
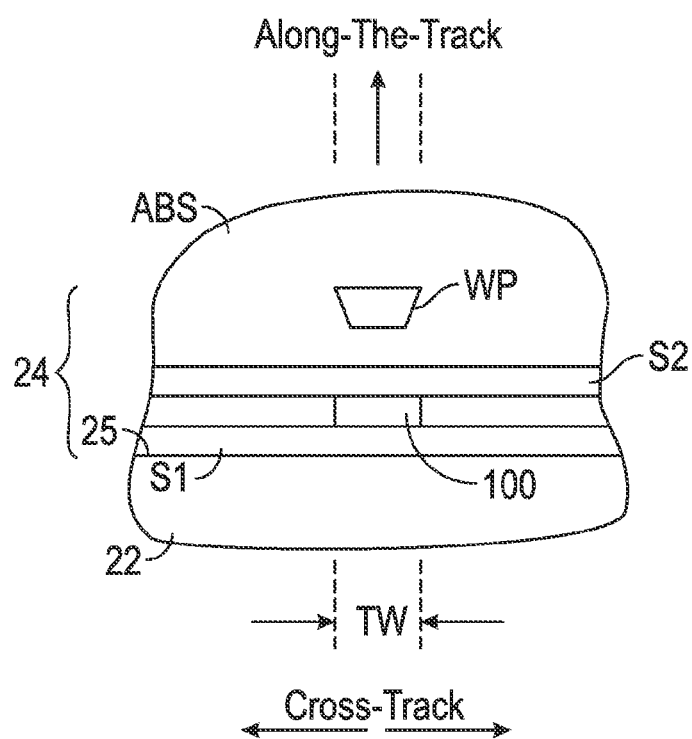
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP MR sensor or read head 100 is located between two magnetic shields S1 and S2. The shields S1, S2 are formed of magnetically permeable material and are electrically conductive so they can function as the electrical leads to the read head 100. The shields function to shield the read head 100 from recorded data bits that are neighboring the data bit being read. Separate electrical leads may also be used, in which case the read head 100 is formed in contact with layers of electrically conducting lead material, such as tantalum, gold, or copper, that are in contact with the shields S1, S2. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4:
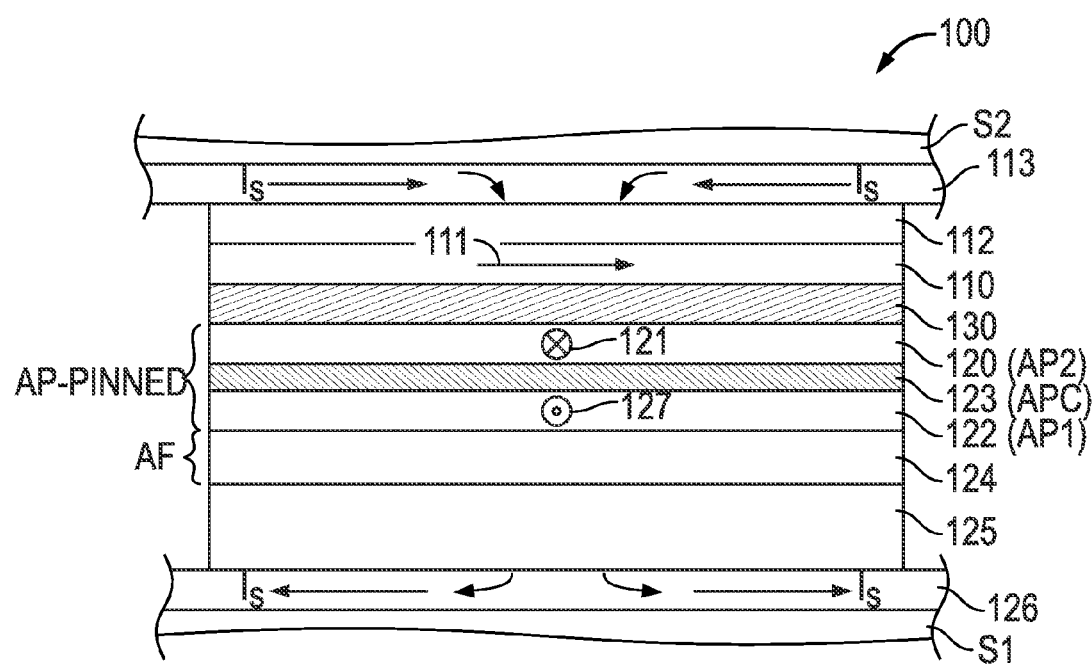
FIG. 4 is a cross-sectional schematic view of a CPP-GMR read head having an antiparallel-pinned (AP-pinned) structure and showing the stack of layers located between the magnetic shield layers.

FIG. 4 is an enlarged sectional view showing the layers making up sensor 100 as would be viewed from the disk. Sensor 100 is a CPP-GMR read head comprising a stack of layers formed between the two magnetic shield layers S1, S2 that are typically electroplated NiFe alloy films. The shields S1, S2 are formed of electrically conductive material and thus may also function as electrical leads for the sense current $I_S$, which is directed generally perpendicularly through the layers in the sensor stack. Alternatively, separate electrical lead layers may be formed between the shields S1, S2 and the sensor stack. The lower shield S1 is typically polished by chemical-mechanical polishing (CMP) to provide a smooth substrate for the growth of the sensor stack. This may leave an oxide coating which can be removed with a mild etch just prior to sensor deposition. The sensor layers include an anti-parallel (AP) pinned (AP-pinned) structure, a free ferromagnetic layer 110, and an electrically conductive nonmagnetic spacer layer 130 between the AP-pinned structure and the free layer 110. A capping layer 112 is located between free layer 110 and the upper shield layer S2. The capping layer 112 provides corrosion protection during processing and magnetically separates the free layer from S2 and may be a single layer or multiple layers of different conductive materials, such as Ru, Ta, NiFe or Cu.

The AP-pinned structure has first (AP1) and second (AP2) ferromagnetic layers separated by a nonmagnetic antiparallel coupling (APC) layer with the magnetization directions of the two AP-pinned ferromagnetic layers oriented substantially antiparallel. The AP2 layer 120, which is in contact with the nonmagnetic APC layer 123 on one side and the sensor's electrically nonmagnetic spacer layer 130 on the other side, is typically referred to as the reference layer 120. The AP1 layer 122, which is typically in contact with an antiferromagnetic layer 124 on one side and the nonmagnetic APC layer 123 on the other side, is typically referred to as the pinned layer. The AP-pinned structure minimizes the net magnetostatic coupling between the reference/pinned layers and the CPP MR free ferromagnetic layer.

The APC layer 123 is typically Ru, Ir, Rh, Cr, Os or alloys thereof. The AP1 and AP2 layers are typically formed of crystalline CoFe or NiFe alloys, or a multilayer of these materials, such as a CoFe/NiFe bilayer. The AP1 and AP2 ferromagnetic layers have their respective magnetization directions 127, 121 oriented antiparallel. The AP1 layer 122 is the pinned layer that has a fixed magnetization direction that is pinned by being exchange-coupled to an antiferromagnetic (AF) layer 124 as shown in FIG. 4. The AF layer 124 is typically one of the antiferromagnetic Mn alloys, e.g., PtMn, NiMn, FeMn, IrMn, PdMn, PtPdMn or RhMn, which are known to provide relatively high exchange-bias fields. Typically the Mn alloy material provides lower or little exchange-biasing in the as-deposited state, but when annealed provides stronger exchange-biasing of the pinned ferromagnetic layer 122. A seed layer 125 may be located between the lower shield layer S1 and the antiferromagnetic layer 124 and enhances the growth of the antiferromagnetic layer 124. The seed layer 125 is typically one or more layers of NiFeCr, NiFe, CoFe, CoFeB, CoHf, Ta, Cu or Ru.

The CPP-GMR sensor is depicted in FIG. 4 with an AP-pinned structure with AP1 as the pinned layer 122. Alternatively, the CPP GMR sensor may have a single or simple pinned layer. In a simple pinned layer, there is no APC layer 123 and no AP2 layer 120, but only the ferromagnetic layer 122 which is the reference layer. The reference layer 122 would be located between and in contact with the antiferromagnetic layer 124 and the electrically conductive spacer layer 130.

The typical materials used for free layer 110 and reference layer 122 are crystalline CoFe or NiFe alloys, or a multilayer of these materials, such as a CoFe/NiFe bilayer. Heusler alloys have been proposed for use as ferromagnetic layers for CPP-GMR sensors. The Heusler alloy may be selected from $Co_2MnX$, $Co_2FeX$ and $Co_{50}(MnFe)_{25}X_{25}$ (where X is one or more of Ge, Si, Sn, Ga or Al). In the case of an AP-pinned structure, the Heusler alloy reference layer is usually separated from the APC layer by a crystalline ferromagnetic material such as Co or CoFe to improve the magnetic coupling between the AP1 and AP2 layers through the APC layer. Similarly, in a simple pinned layer, the Heusler alloy reference layer is separated from the IrMn antiferromagnetic layer by a layer of crystalline CoFe or Co to improve the coupling of the Heusler alloy layer to the IrMn layer.

In embodiments of this invention the spacer layer in a CPP-GMR sensor like that described in FIG. 4 is formed of electrically conductive indium-zinc-oxide (IZO), i.e., $In_2O_3$ plus ZnO where the ZnO is present between 5-30 weight percent. The IZO layer may be sputter-deposited by DC or RF power from a $In_2O_3$—ZnO sputtering target with ZnO between 5-30 weight percent (wt. %), preferably between about 10-20 wt. %. A 300 Å IZO film has longitudinal resistivity ρ of 300-10000 μΩ·μcm, dependent on the deposition and post-annealing conditions, which is more than 100 times larger than for conventional metals, like Cu and Ag, typically used as CPP-GMR spacer layers. The preferred thickness for the IZO spacer layer is between 10-30 Å.

Figures 7, 8:
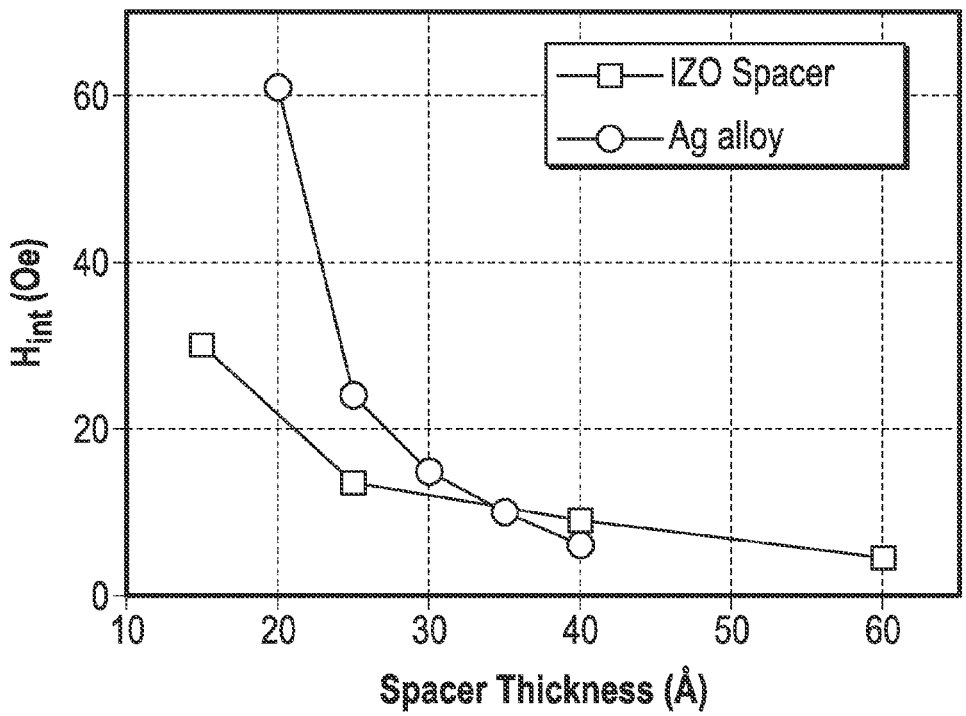
FIG. 7 is a graph of magnetic coupling strength between the reference layer and the free layer ($H_{int}$) as a function of spacer layer thickness for the two types of CPP-GMR sensors listed in FIGS. 5 and 6.
FIG. 8 is a list of the structure of CPP-GMR film stacks with free and reference layers of $CoFe_{50}/Co_2FeGe/CoFe_{50}$ and spacer layers of Ag(9 Å)/IZO(20 Å)/Zn(8 Å) according to embodiments of the invention.

CPP-GMR stacks were investigated with Ag alloy (35 Å) spacer layers (FIG. 5) and IZO spacer layers of various thicknesses (15-60 Å) (FIG. 6). After the completion of all the sputtering processes for the film stacks the films were annealed at 245° C. for 5 hours to introduce an exchange bias pinning to the $CoFe_{50}$ (30 Å) reference layer deposited on the IrMn AF layer. The strength of the magnetic coupling between the reference layer and the free layer is defined as $H_{int}$ ("int" denotes "interlayer" meaning "between layers"). As the thickness of the spacer layer is reduced, $H_{int}$ increases due to two kinds of magnetic coupling. One is by magnetic dipoles caused by the film roughness, and the other is the well-known RKKY (Ruderman-Kittel-Kasuya-Yosida) coupling caused by electron transport in the spacer layer. A large $H_{int}$ degrades the performance of the CPP-GMR sensor. Generally $H_{int}$ less than 50 Oe is preferred. Since it is desirable to reduce the spacer layer thickness to improve the resolution of the read sensor, it is important to have low values of $H_{int}$ as the spacer layer thickness is reduced. FIG. 7 is a graph of $H_{int}$ as a function of spacer layer thickness for the sensors with the two types of spacer layer materials. $H_{int}$ is 60 Oe with a 20 Å Ag alloy spacer layer, which is not optimal for read sensors, but only 30 Oe for a 15 Å IZO spacer layer. This allows the spacer layer to be reduced further in the case of IZO compared to Ag, therefore reducing the sensor thickness and read head resolution. The IZO spacer layer thus enables a greater reduction in spacer layer thickness before introducing unacceptable values of $H_{int}$.

In an embodiment of the invention the spacer layer includes a protective sublayer located below the IZO layer to prevent oxidation of the reference layer from the oxygen in the IZO layer. Sublayer materials that will prevent oxidation may include Ag, Cu, Sn, Zn, Mg and Al. In a preferred embodiment the sublayer is Ag with a thickness between about 2-10 Å.

Figure 9:
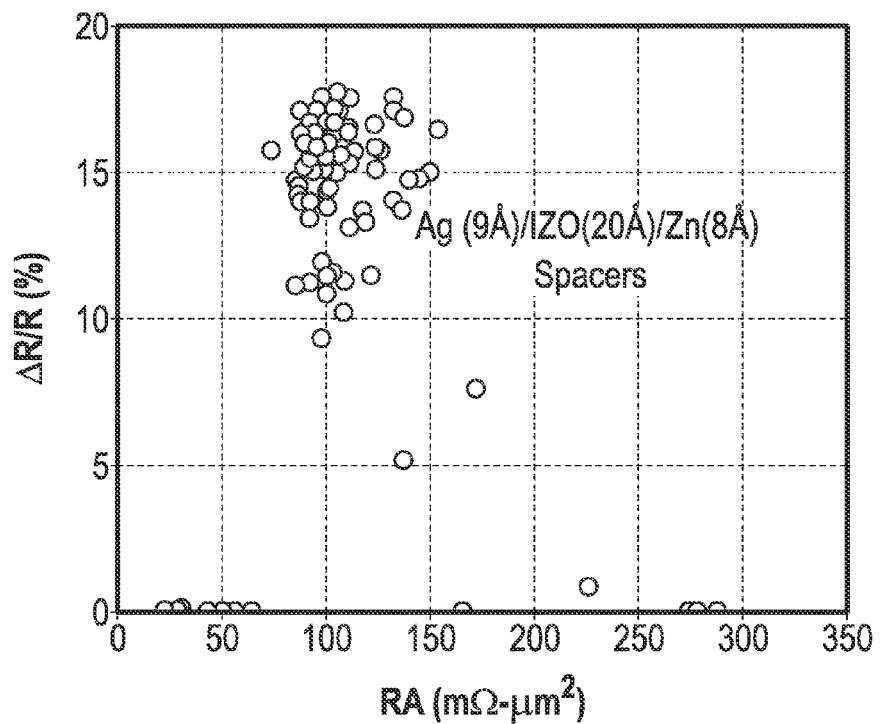
FIG. 9 is a graph of measured magnetoresistance ($\Delta R/R$) as a function resistance-area product (RA) for the CPP-GMR sensors listed in FIG. 8.
Figure 10:
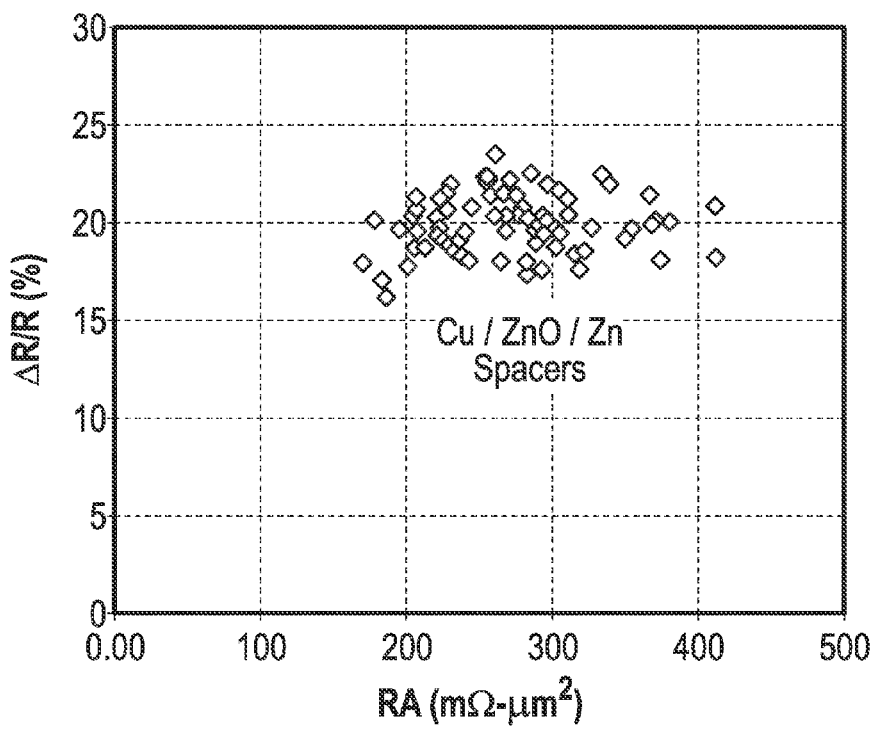
FIG. 10 is a graph of measured magnetoresistance ($\Delta R/R$) as a function resistance-area product (RA) for CPP-GMR sensors with Cu/ZnO/Cu spacer layers according to the prior art.

In an embodiment of the invention the spacer layer includes a top layer consisting essentially of Zn located above the IZO layer below the free layer. The Zn top layer may have a thickness between 2-20 Å, preferably between 2-10 Å. Measurements from a large number of CPP-GMR sensors with free and reference layers of $CoFe_{50}/Co_{35}Fe_{35}Ge_{30}/CoFe_{50}$ and spacer layers of Ag(9 Å)/IZO(20 Å)/Zn(8 Å) show ΔR/R values of about 15-17% and RA values of around 100 mΩ·μm². The structure of these sensors is shown in FIG. 8, and a graph of ΔR/R vs. RA for these sensors is shown in FIG. 9. These ΔR/R values are generally comparable to the measured values for CPP-GMR sensors with Cu/ZnO/Zn spacer layers, as shown in FIG. 10, which is reproduced from the previously cited paper by Shimazawa et al. However, the RA values are around 100 mΩ·μm², which is substantially less than the 200-400 mΩ·μm² range for sensors with Cu/ZnO/Zn spacer layers (FIG. 10). Resistance noise becomes a dominant source of noise in CPP-GMR sensors when the RA value exceeds about 100 mΩ·μm². Also, as shown by a comparison of FIG. 9 with FIG. 10, there is significantly less variation or scatter in the RA values for the sensors with Ag/IZO/Zn spacer layers than for the prior art sensors with Cu/ZnO/Zn spacer layers. A large variation of RA values is an obstacle to high yield wafer-scale manufacturing of CPP-GMR sensors.

Measurements from a large number of CPP-GMR sensors with spacer layers of Ag(9 Å)/IZO(20 Å)/Zn(8 Å) and various types of free and reference layers were made to determine RA values and RA variation. The structure of these sensors is shown in FIG. 11. The sensors with the Heusler alloy $Co_2$(MnFe)Ge in both the free and reference layers exhibited the smallest RA values (slightly less than 100 mΩ·μm²) and the smallest variation in RA values.

Embodiments of the invention are also applicable to CPP-GMR sensors with free and/or reference layers containing CoFe and optionally Ge, i.e., alloys with the formulation $(Co_{50}Fe_{50})_{(100-x)}Ge_x$ (where x is between 0 and 40 .at %).

An advantage of a CPP-GMR sensor with an IZO spacer layer is that the IZO spacer layer is amorphous. This is in contrast to a sensor with a ZnO spacer layer, which is crystalline. An amorphous layer is generally known as a suitable underlayer for the growth of films with a preferred crystalline structure and texture. This is because a film grown on an amorphous underlayer is free from the lattice strain that would be caused by a crystalline underlayer. Thus the amorphous IZO spacer layer acts as an underlayer that promotes the growth of the free layer with its crystalline structure.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A current-perpendicular-to-the-plane giant magnetoresistance (CPP-GMR) sensor comprising:
    a substrate;
    a ferromagnetic reference layer on the substrate having a fixed in-plane magnetization;

a ferromagnetic free layer on the substrate having an in-plane magnetization substantially free to rotate in the presence of an external magnetic field; and an electrically conductive spacer layer comprising a layer of indium-zinc-oxide (IZO) between the free layer and the reference layer, wherein the IZO consists essentially of $In_2O_3$ and ZnO with the ZnO being present in an amount between 5 and 30 weight percent.

2. The sensor of claim 1 wherein the spacer layer includes a protective sublayer between the reference layer and the IZO layer for preventing oxidation of the reference layer.

3. The sensor of claim 2 wherein the protective sublayer is selected from Ag, Cu, Sn, Zn, Mg and Al.

4. The sensor of claim 3 wherein the sublayer consists essentially of Ag and has a thickness greater than or equal to 2 Å and less than or equal to 10 Å.

5. The sensor of claim 1 wherein the spacer layer includes a top layer comprising Zn between the IZO layer and the free layer.

6. The sensor of claim 5 wherein the top layer of Zn has a thickness greater than or equal to 2 Å and less than or equal to 20 Å.

7. The sensor of claim 1 wherein the layer of IZO layer has a thickness greater than or equal to 10 Å and less than or equal to 30 Å.

8. The sensor of claim 1 further comprising an antiferromagnetic layer comprising an IrMn alloy on the substrate between the substrate and the reference layer for pinning the magnetization of the reference layer.

9. The sensor of claim 1 wherein at least one of the free and reference layer comprises an alloy having the formulation $(Co_{50}Fe_{50})_{(100-x)}Ge_x$, where x is greater than or equal to 0 and less than or equal to 40 atomic percent.

10. The sensor of claim 1 wherein at least one of the free and reference layer comprises a Heusler alloy selected from $Co_2MnX$, $Co_2FeX$ and $Co_2(MnFe)X$, where X is one or more of Ge, Si, Sn, Ga or Al.

11. The sensor of claim 10 wherein each of the free and reference layers comprises a Heusler alloy having the composition $Co_2(MnFe)Ge$.

12. The sensor of claim 1 wherein the sensor includes an antiparallel (AP) pinned structure comprising a first AP-pinned (AP1) ferromagnetic layer having an in-plane magnetization, a second AP-pinned (AP2) ferromagnetic layer having an in-plane magnetization substantially antiparallel to the magnetization of the AP1 layer, and an AP coupling (APC) layer between and in contact with the AP1 and AP2 layers, wherein the AP2 layer comprises said reference layer.

13. The sensor of claim 1 wherein the sensor is a magnetoresistive read head for reading magnetically recorded data from tracks on a magnetic recording medium, and wherein the substrate is a first shield formed of magnetically permeable material.

14. A current-perpendicular-to-the-plane giant magnetoresistance (CPP-GMR) read head comprising:

a substrate;

an antiferromagnetic layer on the substrate;

a ferromagnetic reference layer on the substrate having an in-plane magnetization pinned by the antiferromagnetic layer;

a ferromagnetic free layer on the substrate having an in-plane magnetization substantially free to rotate in the presence of an external magnetic field; and an electrically conductive spacer layer between the free layer and the reference layer, the spacer layer comprising an amorphous layer of $In_2O_3$ and ZnO with the ZnO being present in an amount between 5 and 30 weight percent (IZO), a protective sublayer between the reference layer and the IZO layer for preventing oxidation of the reference layer, and a top layer of Zn between the IZO layer and the free layer.

15. The sensor of claim 14 wherein the protective sublayer is selected Ag, Cu, Sn, Zn, Mg and Al.

16. The sensor of claim 14 wherein the top layer of Zn has a thickness greater than or equal to 2 Å and less than or equal to 20 Å.

17. The sensor of claim 14 wherein the layer of IZO layer has a thickness greater than or equal to 10 Å and less than or equal to 30 Å.

18. The sensor of claim 14 wherein at least one of the free and reference layer comprises a Heusler alloy selected from $Co_2MnX$, $Co_2FeX$ and $Co_2(MnFe)X$, where X is one or more of Ge, Si, Sn, Ga or Al.

19. The sensor of claim 14 wherein the sensor includes an antiparallel (AP) pinned structure comprising a first AP-pinned (AP1) ferromagnetic layer having an in-plane magnetization on the antiferromagnetic layer, a second AP-pinned (AP2) ferromagnetic layer having an in-plane magnetization substantially antiparallel to the magnetization of the AP1 layer, and an AP coupling (APC) layer between and in contact with the AP1 and AP2 layers, wherein the AP2 layer comprises said reference layer.

20. A current-perpendicular-to-the-plane giant magnetoresistance (CPP-GMR) sensor comprising:

a substrate;

an antiparallel (AP) pinned structure on the substrate comprising a first AP-pinned (AP1) ferromagnetic layer having an in-plane magnetization, a second AP-pinned (AP2) ferromagnetic layer having a fixed in-plane magnetization substantially antiparallel to the magnetization of the AP1 layer, and an AP coupling (APC) layer between and in contact with the AP1 and AP2 layers;

a ferromagnetic free layer on the substrate having an in-plane magnetization substantially free to rotate in the presence of an external magnetic field; and an electrically conductive spacer layer comprising a layer of indium-zinc-oxide (IZO) between the free layer and the AP2 layer.

* * * * *